INVENTORS
JOSEPH V. D'ONOFRIO
LLOYD WEISMAN
IRWIN STEINBERG.
CONSTANTINE G. VALAVANIS
BY Borst & Borst
ATTORNEYS INVENTORS
JOSEPH V. D'ONOFRIO
LLOYD WEISMAN
IRWIN STEINBERG
CONSTANTINE G. VALAVANIS
BY Brost & Brost
ATTORNEYS United States Patent Office 3,087,156
Patented Apr. 23, 1963

3,087,156
COMPENSATOR FOR VARIATIONS OF PARAMETERS IN TELEMETRY SYSTEMS

Joseph V. D'Onofrio, Hicksville, Lloyd Weisman, Flushing, Irwin Steinberg, Bronx, and Constantine G. Valavanis, Brooklyn, N.Y., assignors to Sperry Rand Corporation, Ford Instrument Company Division, Wilmington, Del., a corporation of Delaware Filed Feb. 16, 1959, Ser. No. 793,589
2 Claims. (Cl. 343—225)

This invention relates to telemetry systems. The accurate reproduction of signals containing data information and generated by equipment located at a mobile or remote station is a problem which has not lent itself to easy solution. This is due to the fact that the generating equipment is caused to operate under severe environmental conditions which lead to parameter variations and with supply voltages which change with load and, of necessity, have certain tolerances. It is highly desirable that the corresponding signals produced by the ground or stationary equipment have a maintained, linear relationship to the original signals so that the data furnished thereby may be accurately ascertained.

This invention contemplates a telemetry system which provides means for determining that an unwanted change has occurred in the transmission of the intelligence bearing signal so that the signal no longer truly represents the information desired and for automatically compensating for the unwanted change in order to bring the information gathered in the mobile station into proper correlation with the indicating output signal at the ground station. To this end an additional signal channel is provided in which there is generated in the mobile station a reference signal which is normally at a fixed position but which is responsive to the changing conditions affecting the generation of the data signal. These undesirable and unpredictable changes are modulated on the reference signal and detected at the ground station where they are employed in a feedback loop to correct the data voltage produced by the ground station equipment.

The telemetry system is described in detail in the following specification which is taken in conjunction with the accompanying drawings in which FIG. 1 is a block diagram of the telemetry system employing a compensator for parameter variation.

Figure 1:
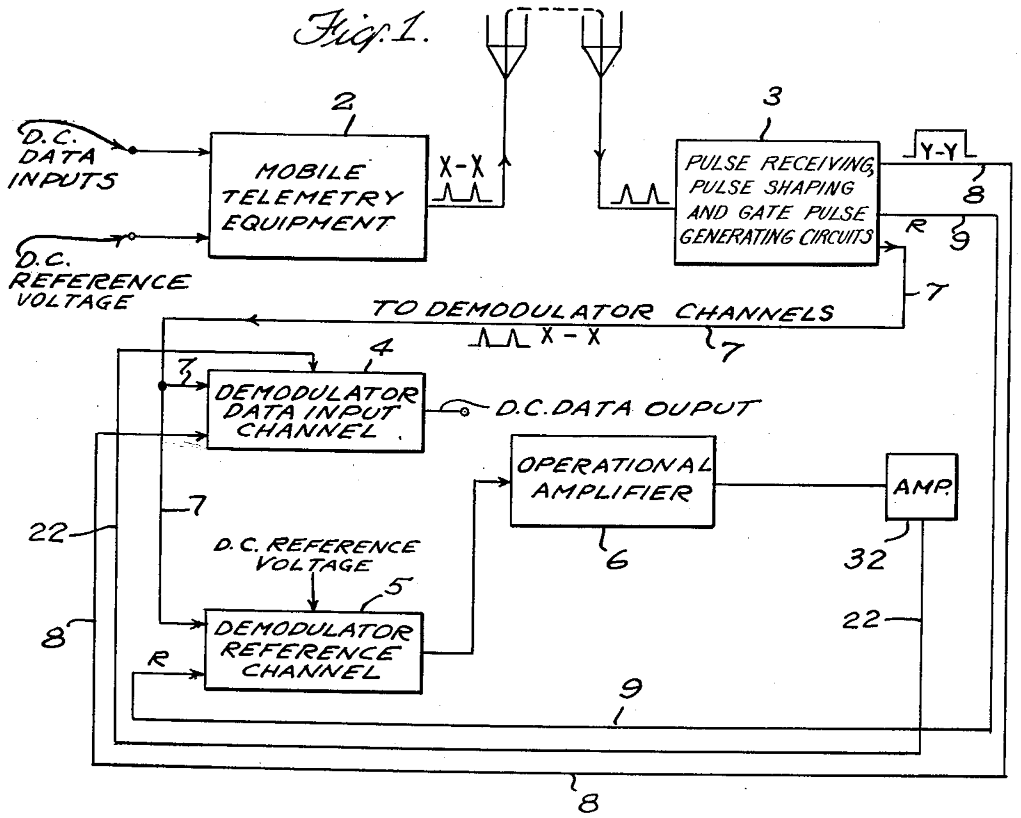

Referring to FIG. 1 there is provided in the mobile station the usual telemetry equipment 2 which is adapted to receive a data signal and a reference signal. The data signal is in the form of a slowly varying D.C. voltage ranging from zero to five volts, and the reference signal is a fixed D.C. voltage. These signals are converted by the telemetry equipment 2 to pulse position modulated pulses X—X, the spacing between the pulses for each signal representing the required information. While the invention is applied to a telemetry system employing pulse position modulation, it is deemed to be equally applicable to other systems which, for example, may utilize pulse width modulation.

The modulated pulses X—X are telemetered by its transmitter antenna to the receiver antenna of the stationary, ground equipment where they are applied to convetnional pulse receiving, shaping and gate pulse generating circuits 3 which are adapted to shape the pulses and separate them according to channel. The properly shaped, modulated pulses X—X and the channel separation gate pulses Y—Y, are introduced by leads 7 and 8 respectively, to demodulator channel 4, channel 4 being arranged to reconvert the pulse position modulated pulses to the same voltage level as the original D.C. data voltage input to the mobile equipment.

The properly shaped, modulated pulses X—X and the reference separation pulse R are introduced by leads 7 and 9 respectively to demodulator reference channel 5. Channel 5 is arranged to apply its D.C. voltage output to operational amplifier 6 which reverses the polarity of any change occurring in the normally fixed reference voltage and applies its output as a charging voltage *z*—*z* to demodulator channel 4 by means of lead 22. The data output voltage of channel 4 is thereby corrected for parameter variation in the mobile telemetry equipment.

Figure 2:
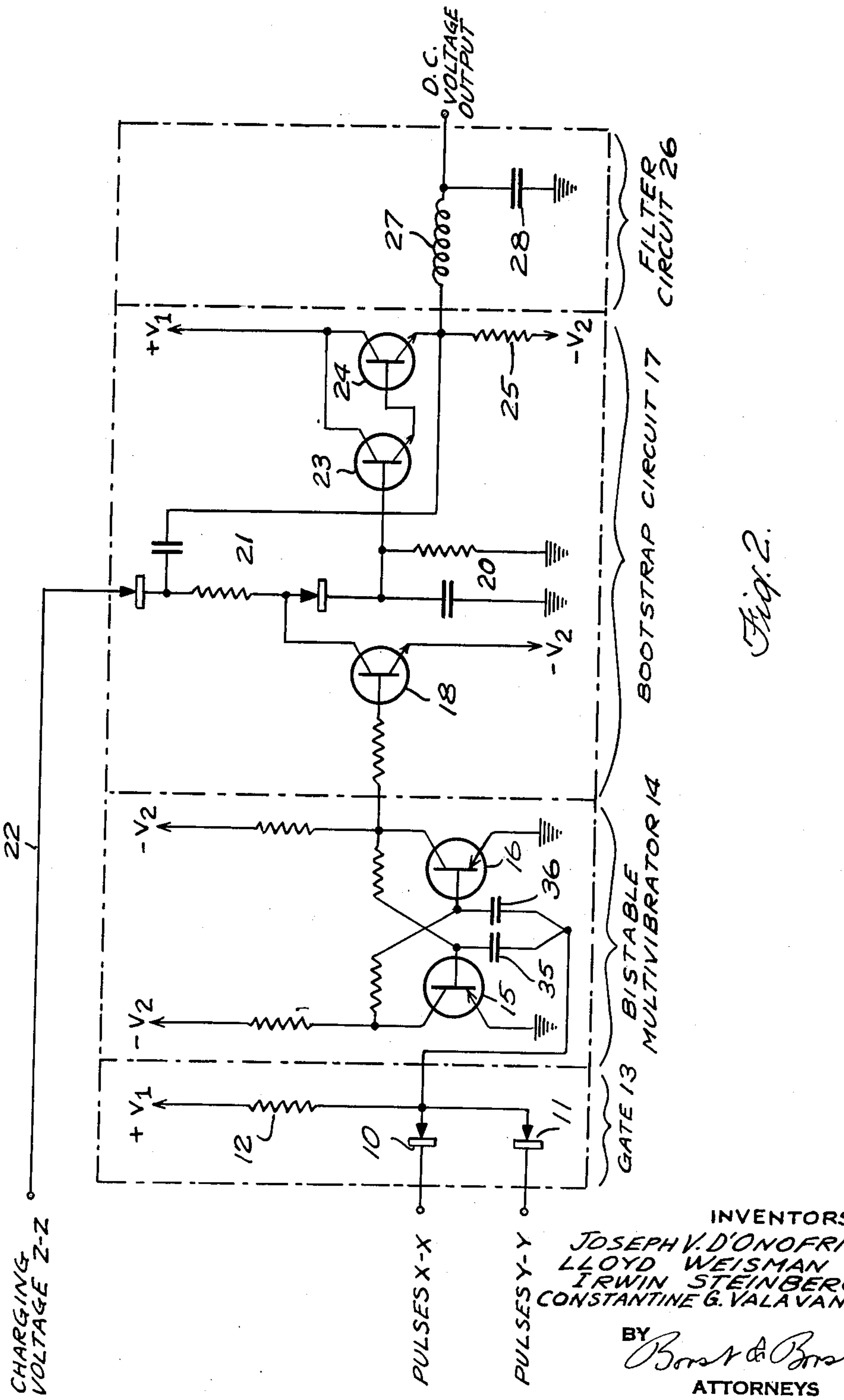
FIG. 2 is a circuit diagram of one of the two identical demodulator channels of the stationary ground equipment.

Referring to the schematic diagram in FIG. 2 which shows a typical demodulator channel employed by the system, the channel separation pulses Y—Y and the modulated pulses X—X are applied to diodes 10 and 11 respectively, of coincidence pulse gate 13. A voltage $+V_1$, is applied across resistor 12 in the gate and when the pulses are coincident, conduction through the resistor is blocked and the full voltage $+V_1$, is applied to bistable multivibrator 14 connected to receive the output of the gate.

The multivibrator comprises a pair of resistance coupled transistors 15 and 16, the bases of the transistors being connected to the output of the gate through capacitors 35 and 36. The emitters of the transistors are grounded and each base electrode is connected through a resistance to the collector electrode of the device which is biased by a voltage source $-V_2$.

The output of the multivibrator 14 is fed to bootstrap circuit 17 which includes a transistor 18 at its input side. Charging circuit 20 receives the output of the transistor 18 and R–C charging circuit 21 receives the charging voltage from the operational amplifier 6 on feedback lead 22. The amount of charge placed in the circuit 20 depends on the pulse width of the multivibrator output which in turn depends on the spacing between the pulses delivered to the multivibrator by the gate. The output of the charging circuit 20 is discharged into series connected transistors 23 and 24 which are collector biased by the voltage source $+V_1$. This charge, however, is subject to modification by the operational amplifier output which is fed to the charging circuit 21 and discharged by this circuit to the output side of the transistor 24 being delivered to a point between its emitter electrode and resistor 25 to which the bias source voltage $-V_2$ is applied.

Filter circuit 26 receives the output of the bootstrap circuit 17 and includes inductance coil 27 and a grounded capacitor 28 connected thereto. The output of the filter circuit is a voltage the level of which is normally that of the original D.C. data voltage.

Figure 3:
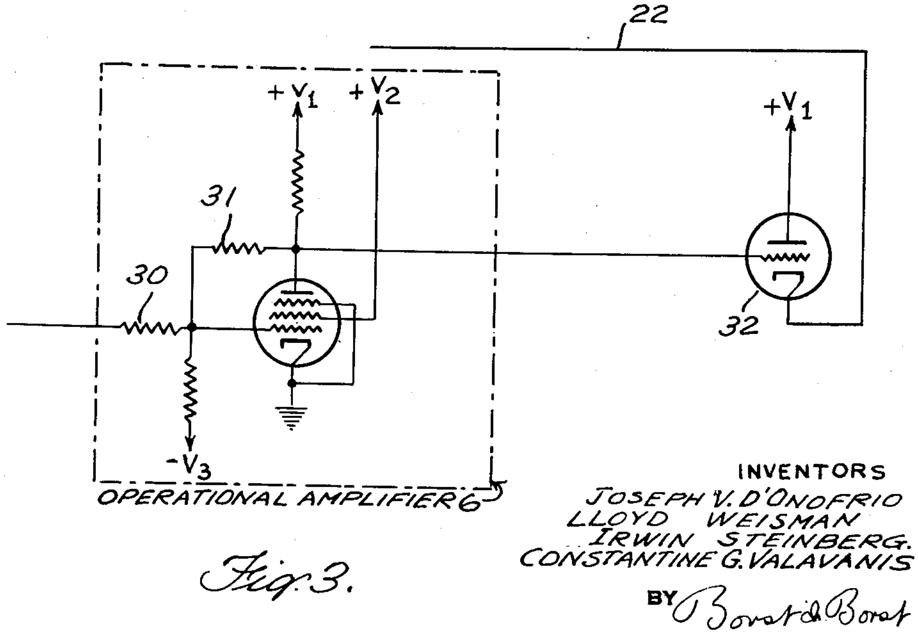
FIG. 3 is a circuit diagram of the operational amplifier adapted to receive the output of the reference signal demodulator channel.

The output voltage of the ground equipment demodulator reference channel 5, which is substantially the same construction as demodulator input channel 4, is adjusted to one particular value of D.C. voltage. This voltage is fed to the grid of the operational amplifier 6 shown in FIG. 3 whose gain is adjusted, by means of resistors 30 and 31 to give a D.C. output voltage at its plate of a specified value. This voltage, taken through a cathode follower, 32, is then fed to the R–C charging circuit 21 in the ground equipment demodulator channel 4 and directly determines the D.C. output information voltage of the channel.

If, during operation, any of the parameters, other than the D.C. input data voltages, in the mobile equipment change for any reason whatsoever, the spacing between the pulse position modulated pulses will change also, and therefore incorrect information will be transmitted to the stationary ground equipment. The pulses generated by the reference channel will also change and this change will be reflected in a change in the same direction in the ground equipment demodulator reference channel D.C. output voltage. Since this latter voltage is fed to the operational amplifier which reverses the polarity of this change, its output may be employed in the demodulator channels to effect parameter variation compensation. This means that if the reference pulse spacing decreases, the output voltage of the operational amplifier will increase. Since this voltage is utilized in the informational demodulator channel to modify the output information voltage, compensation is effected by virtue of the fact that the R–C charging circuit 21 is charged from a larger than normal voltage as determined by the operational amplifier. And, of course, when the reference pulse spacing is increased because of parameter variation in the mobile equipment, compensation is effected in the opposite direction in the ground equipment.

Obviously, the mobile telemetry equipment may be designed to process more than a single D.C. data input in which case there would necessarily be a corresponding informational demodulator channel in the ground equipment for each data input. Various changes and modifications may be effected by persons skilled in the art without departing from the scope and principle of invention as defined in the appended claims.

What we claim is:

1. A telemetry system having telemetering equipment for receiving intelligence data information and a selected reference voltage and transmitting said information and said reference voltage, said equipment including a transmitting antenna, a receiving antenna, a demodulator data input channel, a demodulator reference channel, means disposed between said receiving antenna and each of said channels for separately gating the intelligence data and the reference voltage therein, a reversing polarity, operational amplifier connected to the output of said demodulator reference channel, the output of said operational amplifier being applied to the demodulator data input channel whereby the data output of said demodulator data input channel is modified according to the reversely polarized output of said demodulator reference channel.

2. In a telemetry system at least two demodulator channels, each of said channels having a coincidence gate and means for producing a direct current voltage proportionate to the separation of pulses applied thereto, a polarity reversing, operational amplifier connected to the output of one of said channels, the output of said amplifier being applied to the other of said channels.

References Cited in the file of this patent

UNITED STATES PATENTS 2,468,703 Hammel ______________ Apr. 26, 1949